United States Patent [19]
Fugleberg et al.

[11] 4,148,862
[45] Apr. 10, 1979

[54] HYDROMETALLURGICAL TREATMENT OF SOLUBLE SILICATE-BEARING ZINC MATERIALS

[75] Inventors: Sigmund P. Fugleberg; Jaakko T. I. Poijärvi, both of Pori, Finland

[73] Assignee: Outokumpu Oy, Outokumpu, Finland

[21] Appl. No.: 840,041

[22] Filed: Oct. 6, 1977

[30] Foreign Application Priority Data

Oct. 8, 1976 [FI] Finland ................... 762880

[51] Int. Cl.$^2$ ................... C01B 33/12; C01G 9/06
[52] U.S. Cl. ................... 423/106; 423/109; 423/339
[58] Field of Search ............ 423/101, 102, 106, 109, 423/658.5, 339; 75/101 R, 120

[56] References Cited

U.S. PATENT DOCUMENTS

| | | | |
|---|---|---|---|
| 1,295,080 | 2/1919 | Sulman | 423/102 |
| 3,434,798 | 3/1969 | Menendeg et al. | 423/109 |
| 3,954,937 | 5/1976 | Bodson | 423/101 |

OTHER PUBLICATIONS

Mathew, I. et al., "The Processing of Zinc Silicate Ores—A Review", *Metallurgical Transactions B*, vol. 8B, Mar. 1977, pp. 85-91.
Iler, R., *The Colloid Chemistry of Silica and Silicates*, Cornell Univ. Press, N.Y. 1955, pp. 34, 36, 45-48, 159-169.

*Primary Examiner*—Brian Hearn

[57] ABSTRACT

A hydrometallurgical process for the treatment of a soluble silicate-bearing material for the recovery of its valuable metal content by leaching the silicate-bearing material at an elevated temperature with an aqueous solution of a mineral acid, precipitating silicic acid during the same stage in an easily settling and filtering form, the silicate-bearing material being added at such a rate that its concentration calculated as $SiO_2$ corresponds to the simultaneously precipitating silicic acid quantity, and by finally separating the solid material from the valuable-metal-bearing solution.

5 Claims, 1 Drawing Figure

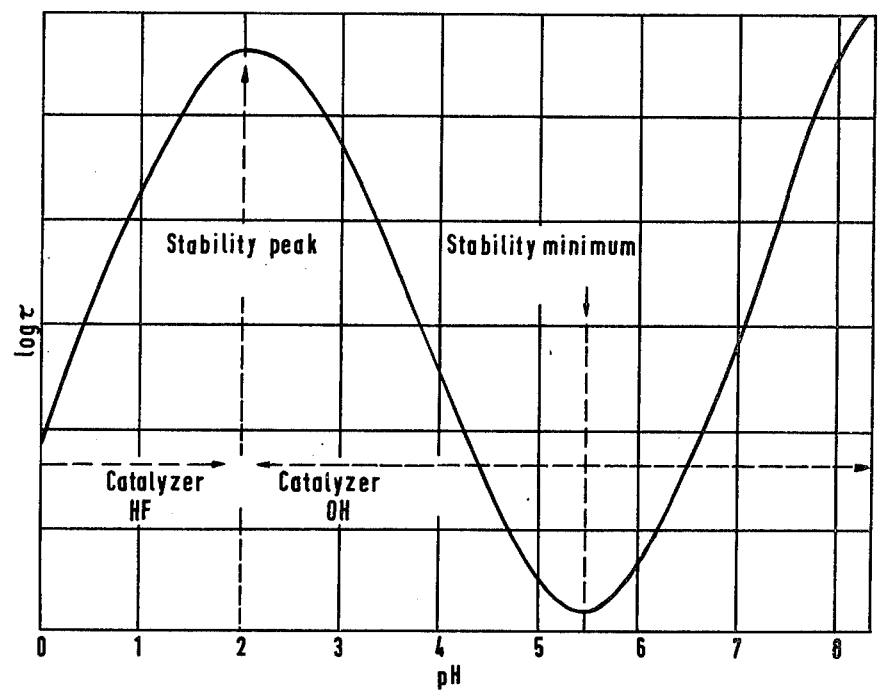

HYDROMETALLURGICAL TREATMENT OF SOLUBLE SILICATE-BEARING ZINC MATERIALS

BACKGROUND OF THE INVENTION

The present invention relates to a process for the treatment of a soluble, silicate-bearing material for the recovery of its valuable metal content.

When materials which contain soluble silicate are leached, great difficulties are often encountered in separating the silicic acid from the solution. Silicic acid precipitates easily from a solution as a gel, which is difficult, if not impossible, to remove from the solution by settling or filtering. One example of this is the treatment of a calcine which contains zinc silicate in electrolytic production of zinc. The silicate dissolves in the sulfuric-acid-bearing return acid from the zinc electrolysis. The obtained zinc sulfate solution is purified and fed to the electrolysis, in which the zinc precipitates and the sulfate is regenerated.

Zinc sulfide concentrate constitutes the bulk of the raw materials used in electrolytic production of zinc. The concentrate is roasted and the produced oxide is leached. Zinc is, however, to a considerable extent present as a silicate, or silicate is produced when roasting or calcining silicate-bearing concentrates, in which case $SiO_2$ reacts with zinc or lead oxide and forms silicates soluble in acid.

In order that such materials could be used for electrolytic production of zinc, it is primarily important to cause the silicic acid to precipitate after the leach in such a form that settling and filtration are technically and economically possible.

Several methods are known for the leach and precipitation. The principle in most methods is to perform the leach using an acid solution, whereby the silicate passes into the solution, whereafter the solution is neutralized using a suitable neutralizing agent (ZnO, CaO). The pH of the solution raises to approx. 5, at which $SiO_2$ is allowed to precipitate. It has, however, been shown that if the precipitation (neutralization) is performed in batches, it is in any case difficult to control the process so as always to obtain good filtrability.

If the neutralization is performed as a continuous process at a pH of 4.5-6.0, the solution which is obtained from the preceding leach performed at a lower pH (1-3.5) can well be filtered even if the $SiO_2$ concentration is as high as 50 g/l (German Lay-open Print No. 1,912,545). It is also known that a solution obtained by the leach process described above (pH 1-3.5 and $SiO_2$ 5-60 g/l) is unstable as regards silicic acid and begins to precipitate sooner or later, in this case as a gel which cannot be filtered. This has been shown experimentally. For this reason, operating such a process on a technological scale is very risky, since precautions must always be taken in case of stoppages, in which case the long retention time in the leach reactors and the high $SiO_2$ concentration cause gel formation. Another disadvantage in such a process lies in that $SiO_2$ precipitates under such conditions and that, if ZnO is used as the neutralizing agent, a complete leaching yield is never obtained since part of the ZnO remains undissolved together with the $SiO_2$ precipitate.

The above known process includes a slow leach of silicate material by a "progressive" acid addition method so that the entire leach proceeds at a low acid concentration and the acid concentration never surpasses 1.5-15 g/l. This is performed in batches so that first a neutral slurry is prepared from the silicate material, and then acid is slowly added until the silicate dissolves. In a continuous process the silicate material is fed into the first reactor and acid is then added into each reactor (at minimum 4) so that a successive leach is achieved and the acid concentration does not rise to 1.5-15 g/l until within the last reactor. This requires a very careful control of each reactor. If too much acid is fed into any reactor, the $SiO_2$ concentration in the solution increases, and if the silicic acid precipitates, a precipitate difficult to filter is obtained. For this reason it is important that the acid concentration remains sufficiently low throughout the leach.

SUMMARY OF THE INVENTION

In the process according to the present invention the silicate-bearing material is added only at such a rate that its concentration calculated as $SiO_2$ corresponds to the simultaneously precipitating silicic acid quantity. The silicates can thus be leached and the silicic acid precipitated in one stage regardless of the acid concentration. Accordingly a very simple process, reliable in use, is obtained. It does not require complicated control or instrumentation. Another advantage of this process lies in that it is also applicable to a simultaneous leach of a slowly dissolving material, such as ferrite.

DESCRIPTION OF THE INVENTION

In experiments performed it has been shown that in a single-stage leach process in which silicates dissolve and $SiO_2$ precipitates it is not decisive that the leach is performed at a high pH and under precisely controlled conditions but that the leaching and precipitating velocities are balanced so that they are equal throughout the process and that the reactions take place at so low a $SiO_2$ concentration that the solution is not greatly oversaturated.

BRIEF DESCRIPTION OF THE DRAWINGS

If the silicate solution is a sol, it can either be stable or coagulate. In the stable case the gelling time, which depends on the pH of the solution, is infinite. The accompanying FIGURE (Gmelin, 15, B, 466, 1959) illustrates the dependence of the gelling time $\tau$ of $SiO_2$ sols on the pH value. The coagulation of the sol depends on its ionization and the pH of the solution. Mono—, bi— and tri-valent ions affect the coagulation of a lyophobic sol, while the adsorption of certain ions is decisive in the coagulation of a lyophilic sol. A sol can coagulate in two manners: by flocculating or by gelling. In a flocculated sol the particles are close together and form large agglomerates, while a gelled sol forms an uninterrupted structure taking water into the pores and settles and filters very poorly, if at all.

In the process according to the present invention a well settling and filtering precipitate is obtained when the leaching and precipitation velocities are kept equal and sufficiently low. This is done by performing the leach and the precipitation in one reactor, whereby the retention time is sufficiently long and the $SiO_2$ concentration remains low. By this procedure the process always remains within the said flocculation range and no gelling occurs.

The process is very suitable for continuous operation. In this case the leach is performed in one reactor, into which the silicate-bearing material is fed continuously at a rate which does not surpass the rate at which the SiO$_2$ precipitates when the SiO$_2$ concentration is approx. 0.5–2 g/l. Acid is added so that its concentration is at least that at which the silicate dissolves, normally so that pH<2.5.

In this manner a very stable process is achieved. The conditions are arranged so that the silicate dissolves rapidly compared with the slow precipitation required by silicic acid, and when the silicate feed rate is simply controlled so that it does not rise over 6 g/l of reactor volume per hour, a situation is created in which undissolved silicate is not stored in the system even if the conditions, mainly the acid concentration, are not correct. The control of the acid addition is limited to controlling the acid cooncentration so that it does not surpass a certain suitable value. It has been shown that the leach can very easily be performed at a high acid concentration, in which case it has not been possible to define any upper limit. This means that factors other than the acid concentration determine the dissolving of silicate and the precipitation of silicic acid. For example, in the electrolytic zinc process it is very important to operate within an acid concentration range of approx. 20–100 g/l, at which zinc ferrite dissolves in addition to zinc silicate.

By the described procedure a SiO$_2$-bearing leach residue is obtained which has good settling and filtering properties. It has, however, also been shown that the filtrability can be improved even further. In the leach there is also present a finely-divided material which during the filtration tends to clog the filter cloth and thereby sooner or later impair the filtrability. This disadvantage can, however, be eliminated by adding a suitable anionic flocculating agent to the solution before filtration, whereby the flocculant agglomerates the finely-divided material. The solution is thus rendered completely clear and the precipitate forms large agglomerates which foul the filter cloth very little, and thus the filtrability remains good. It must also be noted that flocculation is performed immediately before the filtration. Normally in a similar leaching process the flocculant is added before the precipitation. In the precipitation reactor the flocs come under motion and can be broken. For this reason the flocculant must not be added until after precipitation, immediately before filtration.

The process described above is suitable not only for leaching zinc silicates mainly in electrolytic production of zinc, but also for leaching other soluble metal silicates such as slags.

EXAMPLE 1

A zinc calcine which contained zinc 56.0%, lead 2.4%, iron 4.2%, and silicic acid 8.3% and in the roentgen diffractogram of which the phases ZnO, Zn$_2$SiO$_4$, and ZnFe$_2$O$_4$ could be recognized, was leached in continuous laboratory-scale operation in a sulfuric acid solution. Calcine was fed at a rate of 60 g/h, sulfuric acid solution (225 g/l H$_2$SO$_4$) at 300 ml/h, and zinc sulfate solution (150 g/l Zn) at 120 ml/h into a reactor having a volume of approx. 10 l. The retention time in the reactor was approx. 20 h at 70° C., and the average solid concentration was 50 g/l.

Several settling and filtration tests were performed during the run. In general the settling properties of the slurry were poor. The filtration tests were performed by filtering 200 ml slurry in a suction funnel having a diameter of 75 mm.

The first filtration test was performed after 6 h. The filtration time was 40 s, which corresponds to slurry 1.9 m$^3$/m$^2$h. The SiO$_2$ concentration in the filtrate was still 5.5 g/l.

The second filtration test was after 12 h. The filtrability of the slurry began to be impaired when the silicic acid began to gel. The filtration time was 8.5 min, which corresponds to slurry 0.14 m$^3$/m$^2$h. The SiO$_2$ concentration in the filtrate was still 5.3 g/l.

During the following 24 h the slurry was hardly filtrable at all owing to the gelling of the silicic acid. The SiO$_2$ concentration in the filtrate was 0.6 g/l.

From this point on to the end of the trail run the filtrability again began to improve, varying from 6 to 12 min (0.2–0.4 m$^3$/m$^2$h). The silicic acid had obviously converted into an easily filtrable form, for the SiO$_2$ concentration varied until the end of the leach between 0.9 and 1.6 g/l.

In order to improve the filtrability, a flocculant was added to the sample. The precipitate settled to approx. one forth in half an hour. The clear solution was decanted and the underflow having a solid concentration of approx. 200 g/l was filtered. The filtration time was 65 s (1.3 m$^3$/m$^2$h).

The effect of the precipitation on the filtrability was studied by mixing the flocculated sample slowly with a rod for 2 h at 70° C. The underflow having a solid concentration of approx. 200 g/l was filtered. The filtering time was 110 s (0.6 m$^3$/m$^2$h).

A flocculant was again added to the precipitated sample immediately before filtration. The filtering time was 50 s (1.7 m$^3$/m$^2$h).

The filter cake was washed with water on the filter. 30 ml water was filtered through the cake in 50 s. The wet weight of the cake was 33.7 g and its dry weight 12.3 g.

What is claimed is:

1. In a hydrometallurgical process for the treatment of a sulfuric acid soluble silicate-bearing zinc calcine for the recovery of its valuable metal content by leaching the silicate-bearing material at an elevated temperature with an aqueous solution of sulfuric acid and by precipitating silicic acid in a single reactor vessel and subsequently separating the precipitate from the metal-bearing solution; the improvement comprising precipitating the silicic acid in an easily settling and filtering form by adding silicate-bearing material at a rate such that its concentration, calculated as SiO$_2$, corresponds to the simultaneously precipitating silicic acid quantity and the silicate-bearing material is added at a maximum rate of about 6 grams per liter of reactor volume per hour.

2. A process according to claim 1, in which the silicate-bearing material, calculated as SiO$_2$, is added at a maximum rate of approx. 3 grams per liter of reactor volume per hour.

3. A process according to claim 1, in which an anionic flocculant is added to the slurry immediately before the filtration.

4. A process according to claim 1, in which an aqueous solution of a mineral acid is added at such a rate that the pH of the solution is at maximum approx. 2.5.

5. A process according to claim 1, in which silicate-bearing zinc ferrites are leached at a sulfuric acid concentration of 20–100 g/l.

* * * * *